United States Patent

[11] 3,888,043

Child et al.

[45] June 10, 1975

[54] PRODUCTION OF METHANE

[75] Inventors: Edward T. Child, Hacienda Heights; Allen M. Robin, Anaheim, both of Calif.

[73] Assignee: Texaco Inc., New York, N.Y.

[22] Filed: June 25, 1973

[21] Appl. No.: 373,351

[52] U.S. Cl. ............... 48/197 R; 48/202; 48/209; 48/210; 48/211; 48/214; 252/372
[51] Int. Cl. ............................................ C10j 3/00
[58] Field of Search .......... 48/197 R, 202, 209–215; 252/372

[56] References Cited
UNITED STATES PATENTS

| | | | |
|---|---|---|---|
| 2,133,496 | 10/1938 | Winkler et al. | 48/211 |
| 2,660,521 | 11/1953 | Teichmann | 48/211 X |
| 2,662,816 | 12/1953 | Kalbach | 48/202 |
| 2,963,348 | 12/1960 | Sellers | 48/197 R X |
| 3,069,249 | 12/1962 | Herbert et al. | 48/197 R |
| 3,511,624 | 5/1970 | Humphries et al. | 48/197 R |
| 3,671,209 | 6/1972 | Teichmann et al. | 48/197 R |
| 3,709,669 | 1/1973 | Marion et al. | 48/215 |

Primary Examiner—S. Leon Bashore
Assistant Examiner—Alfred D'Andrea, Jr.
Attorney, Agent, or Firm—T. H. Whaley; C. G. Ries; Albert Brent

[57] ABSTRACT

Continuous process for the production of a gaseous stream comprising at least 90 mole % of methane (dry basis) from a sulfur containing hydrocarbonaceous fuel without polluting the environment including the steps of: partial oxidation of the hydrocarbonaceous fuel with air; cooling, cleaning, and purifying the process gas stream to produce a stream of feed gas comprising CO, $H_2$ and containing $N_2$ in the range of about 30 to 60 mole % (dry basis); two separate catalytic methanation steps with an intervening water-gas shift reaction step; and finally separating $CO_2$ and $N_2$ from the process gas stream to produce said methane stream. The large amount of nitrogen diluent in the reacting gas during the methanation step helps to control the normally vigorous exothermic methanation reaction. The product gas has a heating value in the range of about 900–1000 BTU/SCF. It may be used as a substitute for natural gas or as a feedstock for organic chemical synthesis.

17 Claims, 1 Drawing Figure

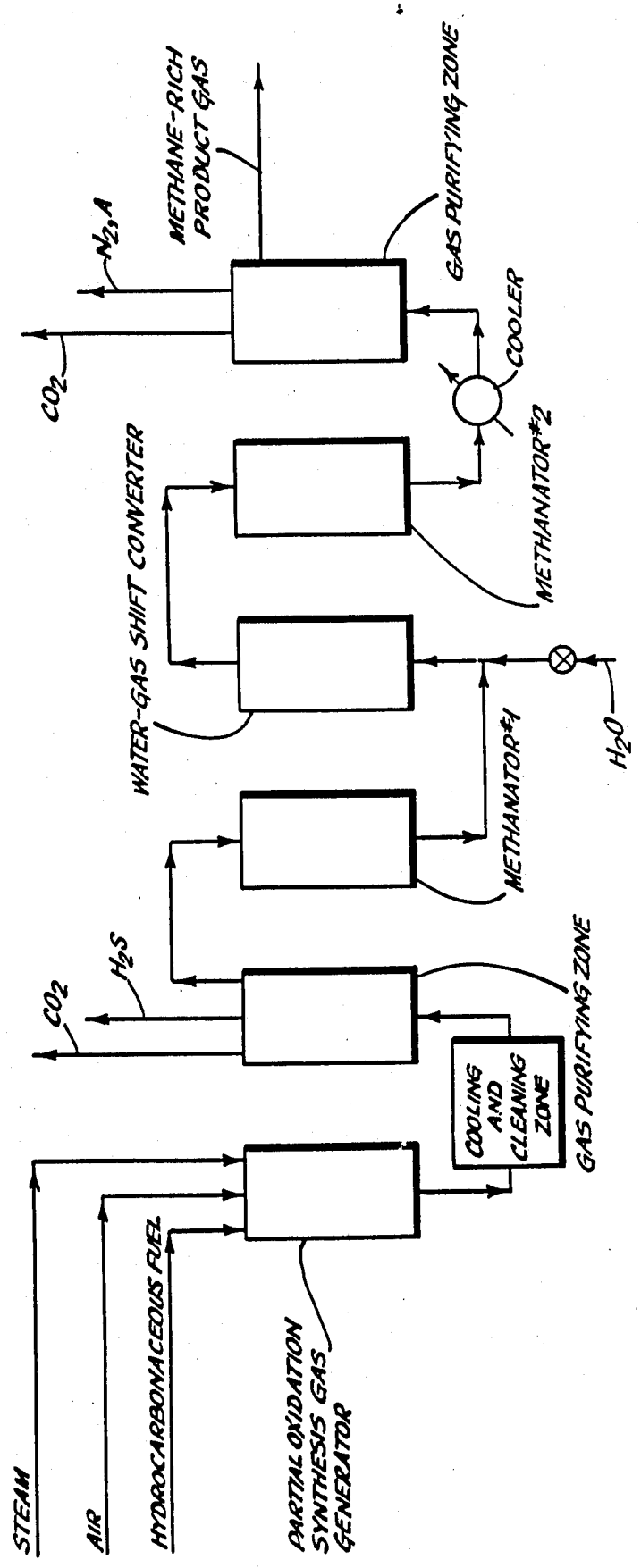

PRODUCTION OF METHANE

BACKGROUND OF THE INVENTION

1. Field of the Invention

This invention relates to a continuous process for the production of a gaseous stream comprising at least 90 mole % methane (dry basis).

2. Description of the Prior Art

Fossil fuels, which took nature millions of years to create, are being consumed at such prodigiuous rates that available petroleum supplies may be good for only 50 more years and coal supplies for two or three more centuries. The accelerating demand for fuel has contributed to the present energy crisis. A typical natural gas contains about 94.9% methane. Since natural gas appears to be the scarcest of the fossil fuels, the development of an economical nonpolluting process for producing synthetic natural gas or substantially pure methane from sulfur containing coal and comparatively low cost petroleum crude or residual products is of considerable importance.

A large amount of heat is released during the catalytic reaction of $H_2$ and CO to produce $CH_4$. Accordingly, sophisticated, complex, and costly methanation systems would ordinarily be required for the methanation of gas mixtures containing a high $CO + H_2$ content. In the subject process, the normally vigorous exothermic methanation reaction is controlled thereby permitting the use of comparatively low cost conventional fixed bed adiabatic reactors.

SUMMARY

This invention pertains to a process for producing a gaseous stream comprising at least 90 mole % methane (dry basis). A hydrocarbonaceous feedstock is subjected to partial oxidation with air or oxygen-enriched air containing from about 50 to 79 mole % $N_2$, and optionally a temperature moderator. The partial oxidation reaction takes place in a free-flow noncatalytic refractory lined synthesis gas generator of an autogenous temperature in the range of about 1500° to 3500°F. and a pressure in the range of about 1 to 350 atmospheres. The effluent gas stream from the gas generator principally comprises CO, $H_2$, $CO_2$, $H_2O$ and minor amounts of $CH_4$, A, $H_2S$ and particulate carbon, as well as from about 30 to 60 mole % of $N_2$, (dry basis).

The raw process gas stream from the gas generator is cooled, cleaned and purified by conventional means to produce a feed gas for catalytic methanation comprising CO and $H_2$ and containing from about 32 to 62 mole % $N_2$ (dry basis). The large amount of nitrogen diluent in the reacting gas during the methanation step helps to control the normally vigorous exothermic reaction.

In a first catalytic methanation step substantially all of the $H_2$ in the process gas stream is reacted with excess CO to produce $CH_4$. Next, supplemental $H_2O$ is added and the process gas stream is reacted by a water-gas shift reaction to produce sufficient hydrogen to react with the remaining CO in a second methanation reaction. Finally, by conventional chemical absorbtion and cryogenic techniques, $CO_2$, $N_2$, $H_2$, CO and A are separated to produce a product gas stream comprising at least 90 mole % methane (dry basis). The product gas may be used as a fuel gas or as feedstock in organic chemical synthesis.

BRIEF DESCRIPTION OF THE DRAWING

The invention will be better understood by reference to the drawing, which illustrates a preferred embodiment of the disclosed process.

DESCRIPTION OF THE INVENTION

The present invention involves an improved continuous process for the production of a gaseous stream comprising 90 mole % $CH_4$ (dry basis) from a hydrocarbonaceous fuel.

A particular advantage of the subject process is that is employs as feedstock readily available, comparatively low cost, hydrocarbonaceous materials e.g., liquid and solid fuels which may contain a comparatively high content of ash and sulfur. The product gas has a heating value in the range of about 900–1000 British Thermal Unit per standard cubic foot (BTU/SCF). It may be used as a substitute for natural gas or in organic chemical synthesis. For example, methanol or formaldehyde may be made by the direct oxidation of methane.

In the subject process, first a continuous stream of process gas is produced in the reaction zone of a separate free-flow unpacked noncatalytic partial oxidation gas generator. The gas generator is preferably a refractory lined vertical steel pressure vessel, such as described in coassigned U.S. Pat. No. 3,639,261 — W. L. Slater.

A wide range of combustible carbon containing organic hydrocarbonaceous materials may be introduced into the reaction zone of the gas generator by way of a burner to be further described. The hydrocarbonaceous fuel is reacted in the gas generator with air or oxygen enriched air containing more than 21 mole % $O_2$ to 50 mole % $O_2$ and from about 50 to 79 mole % $N_2$. Optionally, a temperature-moderating gas may be present.

The term hydrocarbonaceous as used herein to describe various suitable feedstocks is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous". For example, there are (1) pumpable slurries of solid carbonaceous fuels, such as coal, particulate carbon, petroleum coke, concentrated sewer sludge, and mixtures thereof; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

Liquid hydrocarbon fuels are the preferred feedstocks. The term liquid hydrocarbon or liquid hydrocarbon fuel, as used herein to describe suitable liquid feedstocks, is intended to include various materials such as liquefied petroleum gas, petroleum distillates and residues, gasoline, naphtha, kerosine, crude petroleum, asphalt, gas oil, residual oil, tar-sand and shale oil, coal oil, aromatic hydrocarbons (such as benzene, toluene, xylene fractions), coal tar, cycle gas oil from fluid-catalytic-cracking operations, furfural extract of coker gas oil, and mixtures thereof. Gaseous hydrocarbon fuels, as used herein to describe suitable gaseous feedstocks, include ethane, propane, butane, pentane, water-gas, coke-oven gas, refinery gas, acetylene tail gas, ethylene off-gas, and mixtures thereof. Both gaseous and liquid feeds may be mixed and used simultaneously and may include paraffinic, olefinic, naphthenic, aromatic compounds in any proportion, and the waste products thereof.

Also included within the definition of the term hydrocarbonaceous are oxygenated hydrocarbonaceous organic materials including carbohydrates, cellulosic materials, alkehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature; or it may be preheated to a temperature up to as high as about 600° to 1200°F., but preferably below its cracking temperature. The hydrocarbonaceous feed may be introduced into the burner in liquid phase or in a vaporized mixture with a temperature moderator. Suitable temperature moderators include $H_2O$, $CO_2$, a portion of cooled clean process gas, by-product nitrogen from an air separation unit or from a cryogenic gas purification zone to be further described, and mixtures of the aforesaid temperature moderators.

The use of a temperature moderator to moderate the temperature in the reaction zone is optional and depends in general on the carbon to hydrogen ratio of the feedstock and the oxygen content of the oxidant stream. A temperature moderator may not be required with some gaseous hydrocarbon fuels; however, generally one is used with liquid hydrocarbon fuels. When a $CO_2$-containing gas stream such as that obtained subsequently in the process in the gas purification zone, is used as the temperature moderator, the mole ratio ($CO/H_2$) of the effluent product stream may be increased. As previously mentioned, the temperature moderator may be introduced in admixture with either or both reactant streams. Alternatively, the temperature moderator may be introduced into the reaction zone of the gas generator by itself via a separate conduit in the fuel burner.

When $H_2O$ is charged to the reaction zone, it may be in liquid or gaseous phase. It may be in the form of steam or water droplets. Further, the $H_2O$ may be mixed either with the hydrocarbonaceous feedstock or with the free-oxygen containing gas, or with both. For example, a portion of the steam may be intermixed with air in an amount less than about 25 weight percent of the oxygen in the air and any remainder mixed with hydrocarbonaceous materials. The $H_2O$ may be at a temperature in the range of ambient to 1000°F., or more. The weight ratio of water to hydrocarbonaceous feed may be in the range of about 0.0 to 5.0 with liquid hydrocarbon fuels, preferably about 0.2 to 2.0 lbs. of $H_2O$ are charged per lb. of hydrocarbonaceous feed.

The term free-oxygen containing gas or gaseous oxidant as used herein is intended to mean air or oxygen-enriched air. The oxygen-enriched air on a dry basis comprises greater than 21 to 50 mole % $O_2$, 50 to 79 mole % $N_2$, and less than 1 mole % rare gases. The free-oxygen containing gas may be passed through the burner at a temperature in the range of about ambient to 1800°F. The ratio of free-oxygen in the gaseous oxidant to carbon in the feedstock (O/C, atom/atom) is preferably in the range of about 0.7 to 1.5.

The feedstreams are introduced into the reaction zone of the fuel gas generator by means of fuel burner. Suitably, an annulus-type burner, such as described in coassigned U.S. Pat. No. 2,928,460 issued to duBois Eastman et al., may be employed.

The feedstreams are reacted by partial oxidation without a catalyst in the reaction zone of a free-flow refractory-lined gas generator at an autogenous temperature in the range of about 1500° to 3500°F. and at a pressure in the range of about 1 to 350 atmospheres absolute (atm. abs.). Preferably, the reaction temperature is in the range of about 1800° to 2800°F. and the reaction pressure is in the range of about 10 to 150 atm. abs. The reaction time in the fuel gas generator is about 1 to 10 seconds. The mixture of effluent process gas leaving the gas generator may have the following composition on a dry basis in mole %: CO 20 to 45, $H_2$ 15 to 32, $CO_2$ 2 to 6, $N_2$ 30 to 60, $CH_4$ 0 to 5, $H_2S$ nil to 2.0, COS nil to 0.1, and A about 1. Unreacted particulate carbon (on the basis of carbon in the feed by weight) is about 0.2 to 20 weight percent from liquid and solid fuels and is usually negligible from gaseous hydrocarbon feeds. The mole ratio ($CO/H_2$) dry basis of the effluent gas from the generator is in the range of 0.5 to 2, and preferably 1 to 1.8.

While the remaining steps in the process may be conducted at various pressures in the range of about 1 to 350 atm. abs., preferably all of the remaining steps are conducted at the same pressure as that in the gas generator less ordinary drop in the line.

Any ash or slag in the hydrocarbonaceous fuel may be separated from the effluent gas stream leaving the gas generator in a suitable gas-solids separating zone. For example, a vertical slag chamber with a side outlet for the gas stream may be connected in axial alignment with the free-flow gas generator. Ash and other solids in the gas stream discharging from the lower part of reaction chamber may drop directly into a pool of water at the bottom of the slag chamber and periodically removed. A typical arrangement for this is shown in coassigned U.S. Pat. No. 3,639,261.

The effluent gas stream from the gas generator is cooled to a temperature in the range of about 500° to 750°F. While this cooling may be effected by direct contact with water in a quench tank, it is preferable to cool the effluent gas stream by indirect heat exchange with water in a waste-heat boiler, thereby producing steam at a temperature in the range of about 450° to 700°F. for use elsewhere in the process. For example, a conventional quench tank is shown in coassigned U.S. Pat. No. 2,896,927, and a suitable arrangement utilizing a waste-heat boiler is shown in coassigned U.S. Pat. No. 3,709,669.

The partially cooled stream of process gas leaving the waste heat boiler is passed into a gas cleaning zone where particulate carbon and any other remaining entrained solids may be removed. A slurry of particulate carbon in a liquid hydrocarbon fuel may be produced in the gas cleaning zone. Optionally, it may be then recycled to the gas generator as at least a portion of the feedstock. Any conventional procedure suitable for removing suspended solids from a gas stream may be used. In one embodiment of the invention, the stream of fuel gas is introduced into a gas-liquid scrubbing zone where it is scrubbed with a scrubbing fluid such as a liquid hydrocarbon or water. A suitable liquid-gas tray-type column is more fully described in Perry's Chemical Engineers' Handbook, Fourth Edition, McGraw-Hill 1963, Pages 18-3 to 5.

Thus, by passing the stream of process gas up a scrubbing column in direct contact and countercurrent flow with a suitable scrubbing fluid or with dilute mixtures of particulate carbon and scrubbing fluid flowing down the column, the particulate carbon may be removed from the process gas stream. A slurry of particulate carbon and scrubbing fluid is removed from the bottom of the column and sent to a carbon separation or concentration zone. This may be done by any conventional means that may be suitable e.g., filtration, centrifuge, gravity settling, or by liquid hydrocarbon extraction such as the process described in coassigned U.S. Pat. No. 2,992,906. Clean scrubbing fluid or dilute mixtures of scrubbing fluid and particulate carbon may be recycled to the top of column for scrubbing more fuel gas.

Other suitable conventional gas cooling and cleaning procedures may be used in combination with or in place of the aforesaid scrubbing column. For example, the process gas stream may be introduced below the surface of a pool of quenching and scrubbing fluid by means of a dip-tube unit. Or the stream of fuel gas may be passed through a plurality of scrubbing steps including the orifice-type scrubber or venturi or nozzle scrubber, such as shown in Perry's Chemical Engineers' Handbook, Fourth Edition, McGraw-Hill 1963, Pages 18-54 to 56 and coassigned U.S. Pat. No. 3,639,261. The aforesaid gas scrubbing step may not be necessary with gaseous hydrocarbons fuels that produce substantially no particulate carbon.

In a gas purification zone, $CO_2$, $H_2S$, $COS$, $H_2O$, $NH_3$, and other gaseous impurities may be removed from the cooled and cleaned stream of gas leaving the gas cleaning zone. Suitable conventional processes may be used involving refrigeration and physical or chemical absorption with solvents, such as methanol, n-methylpyrrolidone, triethanolamine, propylene carbonate, or alternately with amines or hot potassium carbonate or methanol.

In solvent absorption processes, most of the $CO_2$ absorbed in the solvent may be released by simple flashing. The rest may be removed by stripping. This may be done most economically with nitrogen. Nitrogen is available as a low cost by-product from a cryogenic gas purification zone downstream in the process to be further described. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide. If desired, a stream of $CO_2$-rich gas comprising $CO_2$ in the range of about 25-99 mole %, and preferably more than 98.5% may be produced and recycled to the fuel gas generator for use as all or a portion of the temperature-moderating gas. In such case, small amounts of $H_2S$ and COS may be contained in the $CO_2$ stream.

The $H_2S$ and COS containing solvent may be regenerated by flashing and stripping with nitrogen, or alternatively be heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volumn 19, John Wiley, 1969, Page 353. Excess $SO_2$ may be removed and discarded in chemical combination with limestone, or by means of a suitable commerical extraction process.

In general, the composition of the clean process gas leaving the gas cleaning and purification zone in mole percent on a dry basis is about:
$H_2$ 15 to 34, CO 20 to 45, $CH_4$ 0 to 5, $CO_2$ 0 to 6, $N_2$ 32 to 62, and A about 1. The temperature is in the range of about 100° to 800°F. and preferably about 150° to 500°F., and the pressure is in the range of about 1 to 350 atm. abs. and preferably 10 to 150 atm. abs., and most preferably at a pressure substantially the same as that produced in the gas generator less ordinary line drop. Suitably, the $CO/H_2$ mole ratio is 3 to 5.4 times the stoichiometric $CO/H_2$ mole ratio for the exothermic reaction shown in equation (1). Preferably, the $CO/H_2$ mole ratio is about 1.

$$CO + 3 H_2 \rightarrow CH_4 + H_2O \qquad (1)$$

The clean process gas stream is preferably preheated to a temperature in the range of about 400° to 600°F. by indirect heat exchange with effluent gas from the first methanation zone and then introduced into the catalytic methanation zone. Preferably, substantially all of the $H_2$ in the process gas stream is reacted in the first adiabatic methanation zone with a portion of the CO to produce $CH_4$ and $H_2O$. However, sufficient unreacted CO remains in the process gas stream for reaction in the next two steps in the process. That is, first a portion of the unreacted CO is reacted with $H_2O$ in a water-gas shift reaction to produce additional $H_2$ and $CO_2$, and second the remainder of the CO in the process gas stream is then reacted with the newly produced $H_2$ in a catalytic methanation step to produce additional methane and water. These two steps in the process will be discussed more fully below.

The temperature in the first methanation zone is controlled in a range of about 400° to 1500°F. by maintaining a high mole percent of nitrogen as a diluent in the feed gas to the methanator and by maintaining a deficiency of hydrogen. Accordingly, any conventional methanator may be used in the subject process, e.g. fixed or fluidized bed or catalytic tubes.

Similarly, any conventional methanator catalyst may be employed in the subject process. This is especially true since $H_2S$ and any other gaseous sulfur compounds may be removed from the process gas stream in the gas purification zone as previously described. Alternatively, with a sulfur-resistant methanation catalyst, removal of all or a portion of the gaseous sulfur compounds in the process gas stream may be delayed until after the second methanation step which is performed subsequently in the process.

The Group VIII transition elements, mainly iron, nickel, and cobalt, appear to be the most suitable for use as methanation catalysts. Typical commerical preparations contain about 33 to 78 weight percent of nickel oxide and about 12 to 67 percent of aluminum oxide and are used in the form of three-eighths inch by three-eighths inch or one-quarter inch by one-quarter inch cylindrical tablets. A typical nickel oxide catalyst is Girdler G65 produced by Chemetron Corp. Suitable catalyst compositions include the following:
$NiO—Al_2O_3$ or $NiO—MgO$ precipated on kaolin and reduced with hydrogen; and also in parts by weight Ni 100, $ThO_2$ 6, MgO 12 and Kieselguhr (diatomaceous earth) 400 reduced with hydrogen for 2 hours at 752°F followed by heating for 100 hours at 932°F. The life of a sulfur sensitive catalyst may be extended by maintaining the sulfur level in the reactant gases below about 0.005 grains of sulfur per thousand standard cubic feet. Steam may be added to the reactant gas to decrease the amount of carbon that is deposited; however, in such instance there may be a decrease in methane yield. A suitable operating temperature in the methanator is in the range of about 390° to 1,500°F. For example the preferable exit temperature for the aforesaid $NiO-Al_2O_3$ catalyst is about 662°F. Space velocities range from 100 to 10,000 v/v/hr (standard volumes of gas per volume of catalyst per hr.) and pressures range from 1 to 350 atmospheres.

The effluent gas from the first catalytic methanation zone has the following composition on a dry basis in mole %:
$CO$ 11 to 39, $N_2$ 35 to 75, $CH_4$ 6 to 18, $H_2$ 0 to 5, $CO_2$ 0 to 8, A about 1, and $H_2S$ nil.

The stream of hot effluent gas from the methanator may be cooled to a temperature in the range of about 600° to 800°F. by passing it in indirect heat exchange with incoming feed gas, as previously mentioned. Cooling of this process gas stream may be also effected by means of a waste heat boiler.

The next step in the process involves the water-gas shift reaction. By this reaction sufficient hydrogen is added to the process gas stream to react with the remaining CO in a subsequent second methanation zone. Thus, supplemental $H_2O$ is mixed with the cooled effluent gas stream from the first methanator to provide a mole ratio of $H_2O/CO$ in the range of about 2 to 4. Suitably, the $H_2O$ added is sufficient to produce about 0.97 to 1.03 times the stoichiometric amount of $H_2$ required for the second methanation reaction. Preferably, sufficient $H_2$ should be available in the second methanator so that substantially all of the $H_2$ and all of the CO in the process gas stream react together to produce additional $CH_4$ and $H_2O$. Thus, a temperature in the range of about 600° to 800°F. and a pressure in the range of about 1 to 350 atmospheres and preferably at the pressure in the gas generator less ordinary line drop, the process gas stream may be introduced into a conventional catalytic water-gas shift converter (fixed or fluidized bed) where a portion of the CO and $H_2O$ in the gas stream react exothermically to produce $H_2$ and $CO_2$. Conventional water-gas shift catalysts may be used e.g. iron oxide promoted by 1 to 15 percent by weight of an oxide of a metal such as chromium, thorium, uranium, beryllium and antimony. The effluent gas stream which departs from the catalytic water-gas shift converter is at a temperature in the range of about 700° to 1000°F., and it has a mole ratio $H_2/CO$ in the range of about 2.9 to 3.1. Space velocities may be about 100–10,000 v/v/hr.

Alternatively, the process gas stream from the first methanator in admixture with supplemental $H_2O$ may be subjected to noncatalytic thermal direct water-gas shift reaction in a separate flow-free unpacked adiabatic reaction zone at a temperature of at least 1500°F. and preferably in the range of about 1700° to 2800°F. and a pressure in the range of about 1 to 350 atmospheres and preferably at the same pressure as in the gas generator less ordinary line drop. See coassigned U.S. Pat. No. 3,723,345 — Reynolds. Optionally, it may be necessary to pass the effluent stream from the thermal shift zone into a small catalytic water-gas shift zone, as previously described, where the shift reaction is continued until a mole ratio $H_2/CO$ in the range of about 2.9 to 3.1 is reached.

The effluent gas stream from the water-gas shift conversion zone is dried, for example by cooling below the dew point, to separate any $H_2O$. The temperature of the process gas stream is then adjusted to a temperature in the range 400° to 1000°F. by conventional means and then introduced into a second catalytic methanation zone, somewhat similar to the first methanation zone. The maximum temperature rise in the second methanation zone will be limited by both the CO and $H_2$ contents of the process gas as well as the nitrogen dilution. Preferably, substantially all of the $H_2$ and CO is reacted to produce $CH_4$ and $H_2O$. The effluent gas stream from the second methanator has the following composition on a dry basis in mole %:
$CH_4$ 11 to 27, $N_2$ 35 to 75, $CO_2$ 13 to 30, CO 0 to 2, $H_2$ 0 to 2, A about 1, and $H_2S$ nil.

The effluent gas stream from the second methanator at a temperature in the range of about 700° to 1500°F., is cooled to a temperature in the range of about 200° to 600°F. Cooling may be effected by conventional means e.g., indirect heat exchange in a waste-heat boiler to produce steam.

The cooled process gas stream is then introduced into a gas purification zone where the remaining impurities in the process gas stream are separated e.g., $H_2O$, $CO_2$, $N_2$, $H_2$, CO and A. The gas purification zone as previously described may include any suitable conventional process involving physical or chemical absorption with solvents such as methylpyrrolidone, triethanolamine, methanol, or hot potassium carbonate. Finally, cryogenic cooling may be used to separate a product stream comprising at least 90 mole % $CH_4$ from nitrogen and argon. The product gas has a heating value in the range of about 900–1000 BTU per SCF.

EXAMPLE

The following example illustrates preferred embodiments of the process of this invention. While a preferred mode of operation is illustrated, the example should not be construed as limiting the scope of the invention. The process is continuous and the flow rates are specified on an hourly basis.

1,000,000 standard cubic feet (SCF) of a raw process gas stream is produced by the partial oxidation of a hydrocarbonaceous fuel, to be further described, with air in a conventional vertical noncatalytic free-flow refractory-lined gas generator. The raw gas stream is produced at an autogenous temperature of about 2293°F. and at a pressure of about 60 atm. abs. The average residence time in the gas generator is about 5.5 seconds. The effluent gas leaving the generator has the composition shown in Table I column 1. About 833 pounds of unconverted particulate carbon are entrained in the effluent stream of fuel gas.

The aforesaid process gas stream is produced by continuously introducing into a partial oxidation fuel gas generator by way of an annulus type burner the following charge: 10,800 pounds of reduced crude oil having the ultimate analysis (Wt.%) C 85.9, H 10.8, S 2.3, N 0.8, and ash 0.15. Further, the reduced crude oil has an API gravity of 14.4°, a gross heating value of 18,200 BTU/lb, and a viscosity of 271 Saybolt Seconds Furol at 122°F. Also 803,000 SCF of air at a temperature of 568°F. and 3,320 pounds of steam at a temperature of 568°F. are simultaneously introduced into the reaction zone of the gas generator by way of said burner.

All of the remaining steps in the process are conducted at substantially the same pressure as that in the gas generator less ordinary drop in the line. The hot effluent gas stream leaving the gas generator is passed through a waste heat boiler. By indirect heat exchange with water as a coolant, the stream of effluent gas is cooled to a temperature of about 600°F. Simultaneously, steam at a temperature of about 500°F. is produced in the waste heat boiler. A portion of the steam may be used in subsequent step in the process involving the water-gas shift reaction.

Substantially all of the particulate carbon and any remaining solids are removed from the process gas stream in a conventional gas-liquid scrubbing column. Optionally, a slurry of particulate carbon and crude oil maybe produced and introduced into the gas generator as a portion of the feedstock. $CO_2$, $H_2S$, COS, and $H_2O$, are removed from the stream of process gas in a conventional gas purification zone as previously described, and a stream of acid gas-free process gas is produced having the composition shown in Table I column 2. The stream of acid gas-free process gas at a temperature of about 400°F. and a pressure of about 60 atm. abs. is introduced into a first conventional methanator containing a typical nickel oxide methanation catalyst as previous described. The space velocity is 4000 SCF per CF of catalyst ($hr^{-1}$). The effluent gas stream departing from the first methanator at a temperature of about 1320°F. has the composition shown in Table I column 3. The process gas stream is then cooled in a waste heat boiler and mixed with 23,200 lbs. of $H_2O$. The gas mixture at a temperature of 750°F. and a pressure of about 60 atm. abs. is introduced into a conventional catalytic water-gas shift reactor containing iron oxide water-gas shift catalyst as previously described. The space velocity is 600 SCF of gas per CF of catalyst ($hr^{-1}$). The composition of the shifted gas is shown in Table I column 4.

The effluent gas stream leaves the shift converter at a temperature of about 800°F. and is cooled to remove excess steam by indirect heat exchange with water in a waste heat boiler, thereby producing steam. The dry gas is then heated to 400°F. and passed through a second methanator similar to the first methanator at a space velocity of 4000 SCF of gas per CF of catalyst ($hr^{-1}$).

The effluent gas leaves the second methanator at a temperature is about 800°F. and having the composition shown in Table I column 5. The process gas stream is then cooled to a temperature of about 500°F. in a waste heat boiler and then introduced into a gas purification zone, as previously described, where $CO_2$ is removed. The composition of the $CO_2$-free process gas stream is shown in Table I column 6. Finally, by conventional cyrogenic gas separation techniques a substantially pure stream of methane is separated from nitrogen and argon and small amounts of unreacted hydrogen and carbon hydroxide. The composition of the product gas stream free from $N_2$+A is shown in Table I column 7.

TABLE I

| | | 1 Raw Process Gas | | 2 Acid Gas-Free Process Gas | | 3 Methanator No. 1 Exit | | 4 Shifted Gas | | 5 Methanator No. 2 Exit | | 6 $CO_2$-Free Process Gas | | 7 $N_2$+A-Free Product Gas | |
|---|---|---|---|---|---|---|---|---|---|---|---|---|---|---|---|
| | | % | MSCFH | % | MSCFH | % | MSCFH | % | MSCFH | % | MSCFH | % | MSCFH | % | MSCFH |
| | CO | 22.03 | 220 | 22.94 | 220 | 12.39 | 101 | 3.73 | 33 | 0.23 | 2 | 0.30 | 2 | 0.00 | 0 |
| | $CO_2$ | 3.88 | 39 | 0.00 | 0 | 6.58 | 54 | 13.78 | 122 | 15.39 | 122 | 0.00 | 0 | 0.00 | 0 |
| | $H_2$ | 17.10 | 171 | 17.83 | 171 | 3.79 | 31 | 11.21 | 99 | 0.57 | 4 | 0.60 | 4 | 0.00 | 0 |
| | $N_2$ | 55.35 | 553 | 57.67 | 553 | 67.53 | 553 | 62.31 | 553 | 69.79 | 553 | 82.54 | 553 | 0.00 | 0 |
| | A | 0.07 | 7 | 0.73 | 7 | 0.85 | 7 | 0.79 | 7 | 0.88 | 7 | 1.04 | 7 | 0.00 | 0 |
| | $CH_4$ | 0.79 | 8 | 0.83 | 8 | 8.86 | 73 | 8.18 | 73 | 13.14 | 104 | 15.52 | 104 | 100.00 | 104 |
| | $H_2S$ | 0.15 | 2 | 0.00 | 0 | 0.00 | 0 | 0.00 | 0 | 0.00 | 0 | 0.00 | 0 | 0.00 | 0 |
| | | 100.00 | 1000 | 100.00 | 959 | 100.00 | 819 | 100.00 | 887 | 100.00 | 792 | 100.00 | 670 | 100.00 | 104 |

The process of the invention has been described generally and by examples with reference to hydrocarbonaceous feedstocks and scrubbing fluids of particular compositions for purposes of clarity and illustration only. From the foregoing it will be apparent to those skilled in the art that various modifications of the process and the raw materials disclosed herein can be made without departure from the spirit of the invention.

We claim:

1. A process for producing a stream comprising methane comprising
   1. producing a raw process gas stream principally comprising CO, $H_2$, $CO_2$, $H_2O$ with minor amounts of $CH_4$, A, $H_2S$, particulate carbon and containing from about 30 to 60 mole percent of $N_2$ dry basis by the noncatalytic partial oxidation of a hydrocarbonaceous feedstock with air or oxygen-enriched air comprising about 21 to 50 mole % $O_2$ and from about 50 to 79 mole % $N_2$, and optionally with a temperature moderator, at an autogenous temperature in the range of about 1500° to 3500°F. and a pressure in the range of about 1 to 350 atm. abs. in a free-flow gas generator;
   2. cooling, cleaning and purifying the effluent gas stream from 1 to produce a feed gas for catalytic methanation substantially comprising CO and $H_2$ and containing from about 32 to 62 mole % nitrogen.
   3. reacting the feed gas stream from 2 in a first catalytic methanation zone at a temperature in the range of about 400° to 1500°F. and a pressure in the range of about 1 to 350 atm. abs. until substantially all of the $H_2$ is reacted with a portion of the CO to produce a process gas stream comprising CO, $N_2$, A, $CH_4$ and optionally $CO_2$ and $H_2O$;
   4. introducing the effluent gas stream from 3 into a water-gas shift conversion zone at a suitable temperature along with supplemental $H_2O$, and reacting therein $H_2O$ with a portion of the CO in said gas stream to produce a process gas stream comprising $H_2$, CO, $CO_2$, $CH_4$ and $N_2$, and removing any excess water therefrom;
   5. adjusting the temperature of the effluent gas stream from 4 to a temperature in the range of about 400° to 1000°F., and reacting the $H_2$ and CO in said gas stream in a second catalytic methanation zone to produce a gas stream principally comprising $CH_4$, $CO_2$, $H_2O$, $N_2$ and optionally minor amounts of $H_2$, CO and A; and 6. cooling the effluent gas stream from 5 and separating impurities therefrom to produce said product stream principally comprising methane.

2. The process of claim 1 wherein the pressure in steps 2 to 6 is substantially the same as that in the gas generator in step 1 less ordinary drop in the lines.

3. The process of claim 1 wherein the mole ratio $H_2O/CO$ of the reacting stream in the water-gas shift conversion zone in step 4 is in the range of about 2 to 4.

4. The process of claim 1 wherein said hydrocarbonaceous fuel is a liquid hydrocarbon selected from the group consisting of liquefied petroleum gas; petroleum distillates and residues, gasoline, naphtha, kerosine, crude petroleum, asphalt, gas oil, residual oil, tar-sand oil, shale oil, coal oil; aromatic hydrocarbons such as benzene, toluene, xylene fractions, coal tar, cycle gas oil from fluid-catalytic-cracking operation; furfural extract of coker gas oil; and mixtures thereof.

5. The process of claim 1 wherein said hydrocarbonaceous fuel is a gaseous hydrocarbon selected from the group consisting of ethane, propane, butane, pentane, water gas, coke-oven gas, refinery gas, acetylene tail gas, ethylene off-gas, and mixtures thereof.

6. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

7. The process of claim 1 wherein said hydrocarbonaceous fuel is a pumpable slurry of solid carbonaceous fuels selected from the group consisting of coal, particulate carbon, petroleum cokes, concentrated sewer sludge in a vaporizable carrier such as water, liquid hydrocarbon fuel and mixtures thereof.

8. The process of claim 1 further provided with the step of preheating the hydrocarbonaceous fuel to a temperature up to 1200°F. but below its cracking temperature prior to introducing said fuel into the gas generator in step 1.

9. The process of claim 1 wherein the temperature moderator in step 1 is selected from the group consisting of $H_2O$, $CO_2$, a portion of cooled clean process gas, by-product nitrogen from an air separation unit or from a cryogenic gas purification zone, and mixtures of the aforesaid temperature moderators.

10. A process for producing a stream comprising at least 90 mole % methane comprising
   1. producing a raw process gas stream principally comprising CO, $H_2$, $CO_2$, $H_2O$ with minor amounts of $CH_4$, A, $H_2S$, particulate carbon and containing from about 30 to 60 mole percent of $N_2$ dry basis by the noncatalytic partial oxidation of a hydrocarbonaceous feedstock with air or oxygen-enriched air comprising about 21 to 50 mole % $O_2$ and from about 50 to 79 mole % $N_2$, and optionally with a temperature moderator, at an autogenous temperature in the range of about 1500° to 3500°F. and a pressure in the range of about 1 to 350 atm. abs. in a free-flow gas generator;
   2. cooling, cleaning and purifying the effluent gas stream from 1 to produce a feed gas for catalytic methanation substantially comprising CO and $H_2$ with a mole ratio $CO/H_2$ in the range of about 1 to 1.8, and containing from about 32 to 62 mole % nitrogen;
   3. reacting the feed gas stream from 2 in a first catalytic methanation zone at a temperature in the range of about 400° to 1500°F. and a pressure in the range of about 1 to 350 atm. abs. until substantially all of the $H_2$ is reacted with a portion of the CO to produce a process gas stream comprising CO, $N_2$, A, $CH_4$ and optionally $CO_2$ and $H_2O$;
   4. introducing the effluent gas stream from 3 into a water-gas shift conversion zone at a suitable temperature along with supplemental $H_2O$ to provide a $H_2O/CO$ ratio in the range of about 2 to 4, and reacting therein $H_2O$ with a portion of the CO in said gas stream to produce a process gas stream comprising $H_2$, CO, $CO_2$, $CH_4$ and at least 35 mole % $N_2$, on a dry basis and wherein the mole ratio $H_2/CO$ is in the range of about 2.9 to 3.1;
   5. cooling the effluent gas stream from 4 to remove the excess water and then heating the dry gas to a temperature in the range of about 400° to 1000°F., and reacting the $H_2$ and CO in said gas stream in a second catalytic methanation zone until substantially all of the $H_2$ and CO are converted into $CH_4$; and
   6. cooling the effluent gas stream from 5 and separating therefrom $CO_2$, $N_2$ and A thereby producing said product gas stream comprising at least 90 mole % methane.

11. The process of claim 10 wherein step 4 said $H_2O$ is reacted with a portion of the CO in a catalytic water-gas shift conversion zone at a temperature in the range of about 600° to 1000°F.

12. The process of claim 10 where in step 4 said $H_2O$ is reacted with a portion of the CO in a noncatalytic thermal direct water-gas shift conversion zone at a temperature in the range of about 1500° to 2800°F.

13. The process of claim 10 wherein the pressure in steps 2 to 6 is substantially the same as that in the gas generator in step 1 less ordinary drop in the lines.

14. The process of claim 10 wherein said hydrocarbonaceous feedstock is a liquid hydrocarbon fuel and steam is used as a temperature moderator.

15. The process of claim 10 wherein the cooling of the raw process gas stream in step 2 is effected by indirect heat exchange with water in a waste heat boiler thereby producing steam, and at least a portion of said steam is introduced into the water-gas shift conversion zone in step 4 as said supplemental $H_2O$.

16. The process of claim 10 wherein said hydrocarbonaceous fuel is comprised of a slurry of coal and water.

17. The process of claim 10 wherein the catalyst in steps 3 and 5 comprises Nickel oxide and aluminum oxide and the space velocity in each methanation zone is in the range of about 100 to 10,000 standard volumes of gas per volume of catalyst per hour.

* * * * *

UNITED STATES PATENT OFFICE
CERTIFICATE OF CORRECTION

PATENT NO. : 3,888,043
DATED : June 10, 1975
INVENTOR(S) : EDWARD T. CHILD AND ALLEN M. ROBIN It is certified that error appears in the above-identified patent and that said Letters Patent are hereby corrected as shown below:

Col. 1, line 10   Change "prodigiuous" to --prodigious--

Col. 2, line 13   Before "employs" change "is" to --it--

Col. 6, line 17   In equation (1) insert an arrow between "$H_2$" and "$CH_4$"

Col. 10, line 5   Change "hydroxide" to --monoxide--

Signed and Sealed this

Twelfth Day of April 1977

[SEAL]

Attest:

RUTH C. MASON
*Attesting Officer*

C. MARSHALL DANN
*Commissioner of Patents and Trademarks*